March 1, 1966   G. R. JEWELL   3,237,478
MOTION TRANSMITTING LINKAGE
Filed Sept. 3, 1963   3 Sheets-Sheet 3
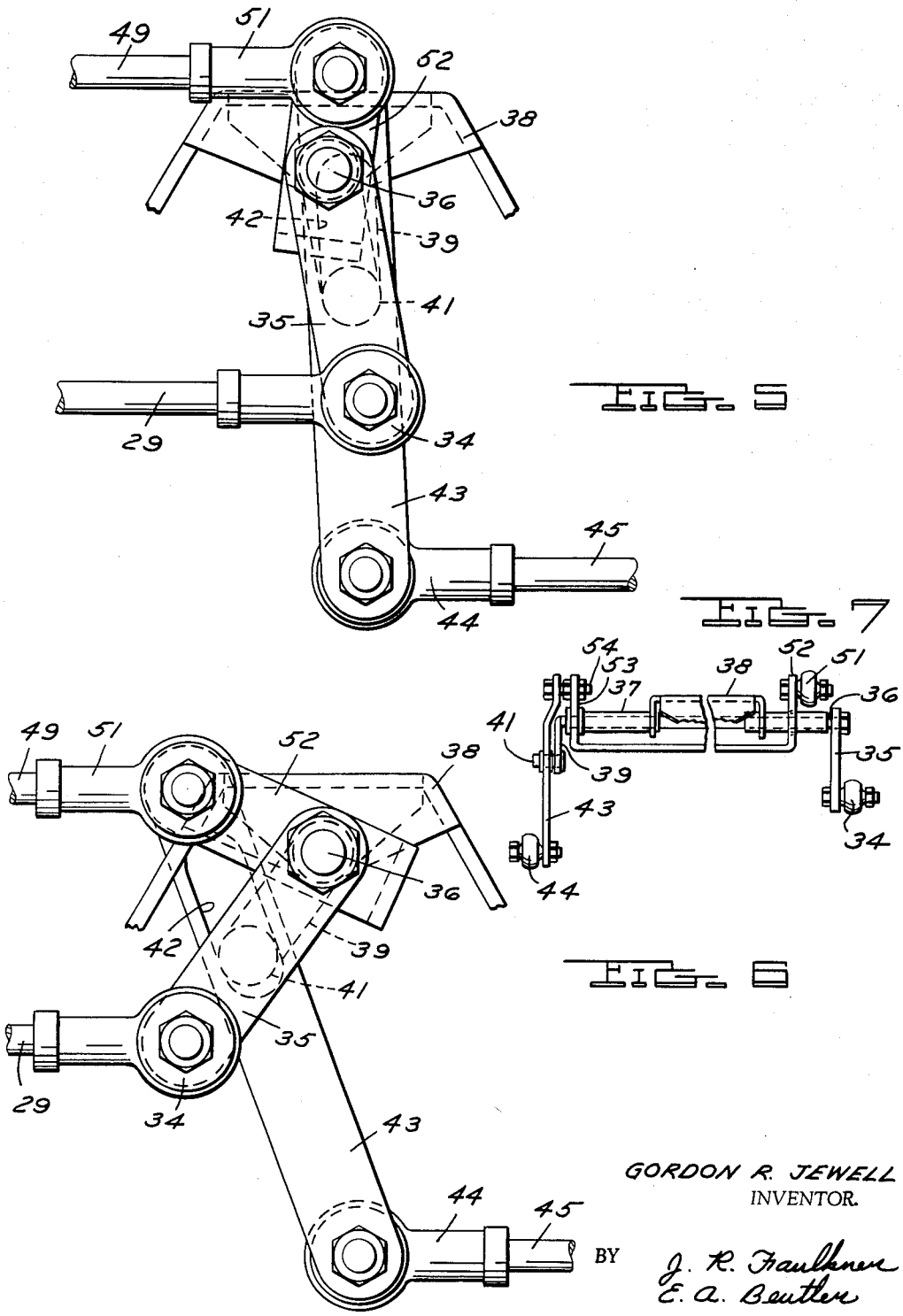
GORDON R. JEWELL
INVENTOR.
BY J. R. Faulkner
E. A. Beutler
ATTORNEYS United States Patent Office 3,237,478
Patented Mar. 1, 1966

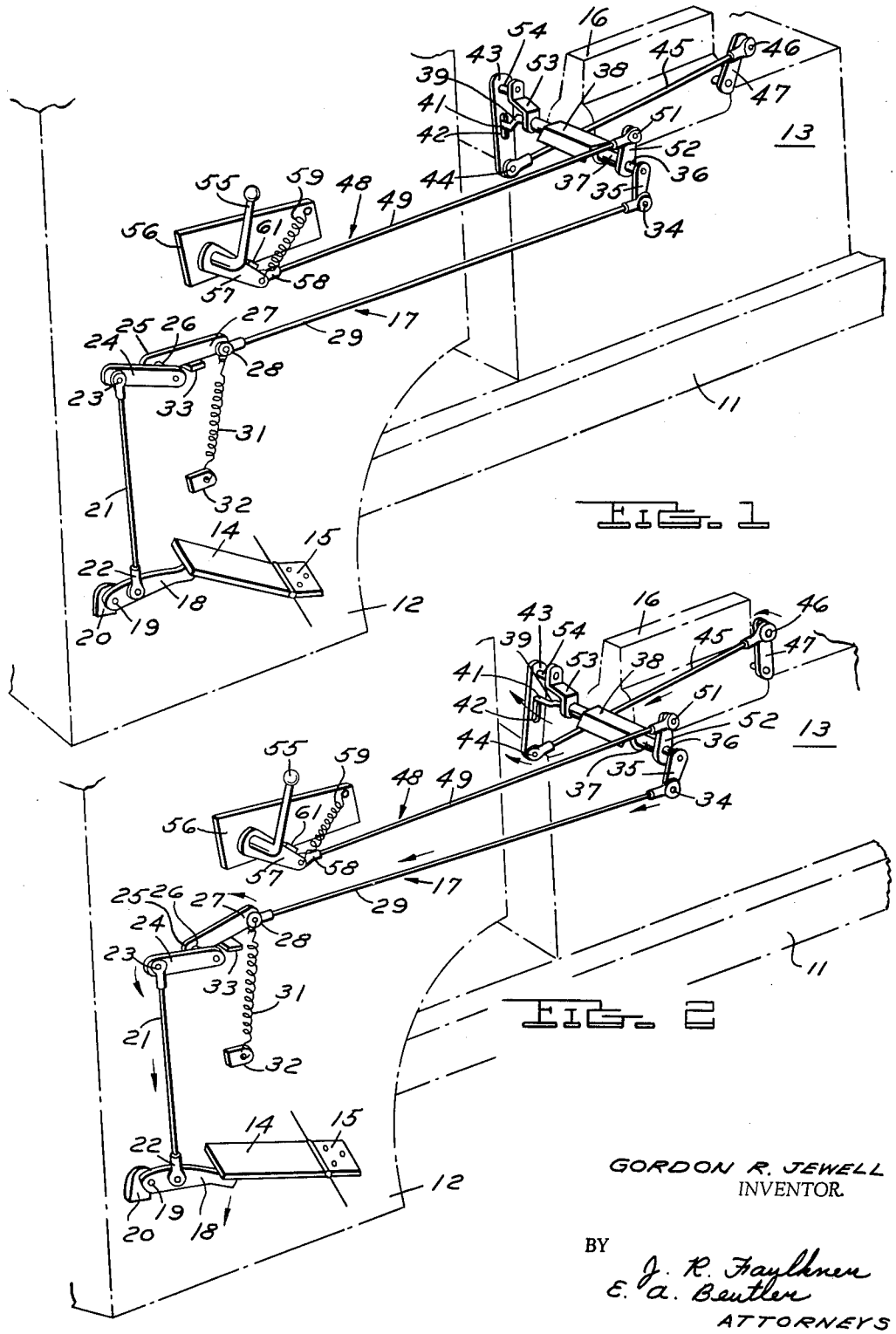

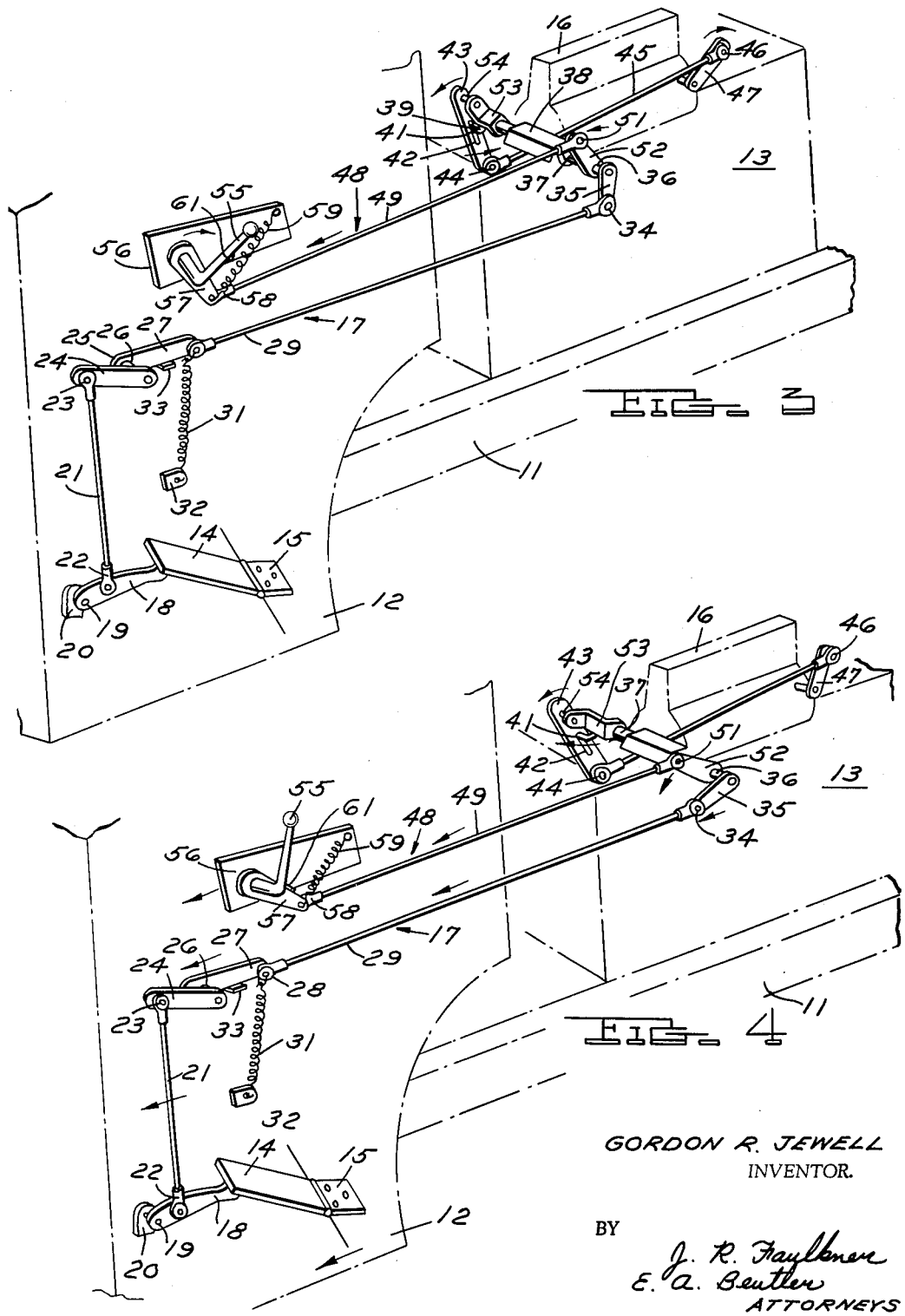

3,237,478
MOTION TRANSMITTING LINKAGE
Gordon R. Jewell, Plymouth, Mich., assignor to Ford Motor Company, Dearborn, Mich., a corporation of Delaware
Filed Sept. 3, 1963, Ser. No. 305,930
8 Claims. (Cl. 74—513)

This invention relates to a motion transmitting linkage that finds particular application as a motor vehicle accelerator linkage.

Frequently, it is necessary to transmit positive and accurate control movement between a pair of members that are supported upon separate, relatively movable components. The movement that occurs between the components should not affect the positions of each member in relation to its supporting component. A motor vehicle is a typical example of an application wherein this problem of transmitting positive control movement exists.

In a motor vehicle the engine and, quite frequently, the body are resiliently supported upon the chassis to isolate vibrations from the vehicle passengers. The resilient supports of the engine and body allow a considerable relative movement between the engine and chassis and between the body and chassis. It follows, therefore, that the engine and body move relative to each other. It is necessary, however, to transmit positive control movement from an accelerator pedal that is supported within the passenger compartment of the body to a speed controlling device that is supported upon the engine.

The conventional accelerator linkage consists of a plurality of links and levers that connect the accelerator pedal to the engine speed controlling device. With the conventional linkage, movement of the engine is transmitted into movement of the accelerator pedal and movement of the body is transmitted into movement of the speed controlling device of the engine. The first mentioned condition will cause hunting of the engine speed while the other condition will produce a phenomenon known as pedal walk.

It, therefore, is the principal object of this invention to provide a motion transmitting mechanism that transmits positive control movement between a pair of members supported upon relatively movable components wherein the position of the members relative to their components is not affected by relative movement of the components.

It is a further object of this invention to provide an improved motor vehicle accelerator linkage that permits considerable resilience to be employed in the support of the engine and body upon the chassis without causing their relative movement to affect the position of the accelerator pedal and engine speed controlling device.

This invention is embodied in a motion transmitting linkage for transmitting positive control movement from an actuating member supported for control movement on a first component to an actuated member supported for controlled movement upon a second component wherein the components are relatively movable. The motion transmitting linkage includes an actuating mechanism for transmitting control movement from the actuating member to the actuated member upon control movement of the actuating member relative to the first component. A motion cancelling mechanism is also provided for transmitting a negative movement signal to the actuating mechanism upon relative movement of the components for precluding control movement of the members relative to their supporting components.

The motion transmitting linkage described has particular application in a motor vehicle wherein the actuating member is the accelerator pedal of the vehicle and the other member is the speed controlling device of the engine. The relatively movable components are the engine and body that are supported resiliently upon the vehicle chassis.

Further objects and advantages of this invention will become more apparent as this description proceeds particularly when considered in conjunction with the accompanying drawings wherein:

FIGURES 1–4 are schematic perspective views of a motor vehicle having an accelerator linkage embodying this invention. The various views show the accelerator linkage in several different positions:

FIGURE 1 illustrates the accelerator linkage in the engine idle condition wherein no relative movement between the body and engine has occurred.

FIGURE 2 illustrates the direction of movement of the accelerator linkage during an increase in engine running speed.

FIGURE 3 illustrates the operation of a fuel shut-off mechanism.

FIGURE 4 illustrates the position of the accelerator linkage when the body moves relative to the engine.

FIGURE 5 is a side elevational view of a portion of the accelerator linkage.

FIGURE 6 is a side elevational view, in part similar to FIGURE 5, showing the linkage in another position.

FIGURE 7 is an end elevational view of the portion of the accelerator linkage shown in FIGURES 5 and 6.

Referring now in detail to the drawings and in particular to FIGURES 1–4, a motor vehicle of the well-known cab over-engine truck type is illustrated schematically. The truck includes a chassis frame having a member 11 upon which is resiliently supported a body 12 and an engine 13. The resilient supports of the body 12 and engine 13 upon the chassis frame member 11 are well known and not shown in detail. As is also well known in this type of vehicle, the resilient support of the body 12 on the chassis permits considerable movement of the body with respect to the chassis and engine 13.

An accelerator pedal 14 is pivotally supported by a bracket 15 upon the floor of the passenger compartment portion of the body 12. A speed controlling device 16, in this case the governor of a fuel injection pump, is rigidly supported upon the engine 13. An accelerator linkage, indicated generally by the reference numeral 17 is provided to transmit control movement from the accelerator pedal 14 to the engine speed controlling device 16. An accelerator pedal level 18 is pivotally connected at its rearward end to the upper end of the accelerator pedal 14 and at its forward end by a pivot pin 19 to a bracket 20 secured to the body 12. The lower end of an accelerator link 21 is pivotally connected, as at 22, to the accelerator pedal lever 18 intermediate its ends. The upper end of the accelerator link 21 is pivotally connected, as at 23, to a forwardly extending arm 24 of a bell crank assembly 25. The bell crank assembly 25 is pivotally supported upon a pivot pin 26 that is suitably supported upon the body 12. A rearwardly extending arm 27 of the bell crank 25 is pivotally connected, as at 28, to the forward end of a governor control link 29.

A tension spring 31 is connected at one of its ends to the outer end of the bell crank arm 27 and at its other end to the body 12, as at 32. The tension spring 31 normally urges the bell crank assembly 25 into contact with an adjustable stop 33 to determine an idle position for the accelerator linkage 17.

The rearward end of the governor control link 29 is pivotally connected, as at 34, to the end of a crank arm 35. The crank arm 35 is rigidly connected to a rod 36 that is journaled in a tubular member 37. The tubular member 37 is pivotally journaled in a bracket 38 that is affixed to the engine 13. The rod 36 extends outwardly at the opposite side of the tubular member 37 and is formed with a crank shaped end 39 that terminates in an outwardly extending portion 41. The portion 41 is pivotally guided in an elongated slot 42 formed in a lever 43. The lower end of the lever 43 is pivotally connected, as at 44, to a governor link 45. The rear end of the governor link 45 is pivotally connected, as at 46, to the speed control level 47 of the governor 16.

With the portion of the accelerator linkage thus far described, movement of the body 12 upon its resilient support relative to the chassis frame member 11 and the engine 13 will be transmitted through the throttle control link 29 to change the position of the speed control lever 47. Unless some compensation is made, relative movement of the body 12 will result in changes in running speed of the engine 13. A motion cancelling mechanism, indicated generally by the reference numeral 48, is provided to transmit a negative motion signal to the accelerator linkage 17 in substantially the same degree but in an opposite sense than that transmitted by the relative movement of the body 12. The motion cancelling mechanism 48, therefore, insures that changes in the position of the body 12 will not effect a change in engine speed.

The motion cancelling mechanism 48 includes a link 49 that is pivotally connected at its rear end, as by the connection 51, to a crank arm 52 that is affixed to one end of the tubular member 37. A second crank arm 53 is rigidly connected to the other end of the tubular member 37. A pivot pin 54 extends outwardly from the upper end of the crank arm 53 and is pivotally connected to the upper end of the lever 43. The pivot pin 54 normally forms the point of pivotal support for the lever 43.

The forward end of the link 49 is connected to the body 12 so that movements of the body 12 are transmitted through the crank arm 52, tube 37, crank arm 53 and pin 54 to the lever 43. To accomplish this purpose, the forward end of the link 49 may be pivotally connected at any suitable point to the body 12. In this instance, however, it is preferred to pivotally connect the forward end of the link 49 to a fuel shut off lever 55 so that it may serve a dual purpose.

The fuel shut off lever 55 is pivotally supported upon a bracket 56 affixed to the body 12. The fuel shut off lever 55 is rigidly connected to a crank arm 57 that is pivotally connected, as at 58, to the forward end of the link 49. A tension spring 59 is connected at one end to the crank arm 57 and at the other end to the bracket 56 to normally urge the fuel shut off lever 55 into abutment with a stop 61 that is affixed to the bracket 56.

Operation

With the engine 13 running and the accelerator pedal 14 not depressed, the tension spring 31 urges the arm 27 of the bell crank 25 into abutment with the stop 33 to fix the idle speed of the engine (FIGURE 1). The tension spring 59 also urges the crank arm 57 into engagement with the stop 61 to hold the fuel shut off lever 55 in its "off" position.

When the accelerator pedal 14 is depressed, it pivots in a counterclockwise direction about its pivotal support with the bracket 15. Depression of accelerator pedal 14 causes the accelerator pedal lever 18 to be rotated in a clockwise direction about the pivot pin 19 (FIGURE 2). The accelerator link 21 is drawn downwardly rotating the bell crank assembly 25 in a counterclockwise direction in opposition to the action of the tension spring 31. The counterclockwise rotation of the bell crank assembly 25 draws the governor control link 29 forwardly and rotates the crank arm 35 and rod 36 in a clockwise direction. The crank shaped end 39 is also rotated in a clockwise direction with resulting movement of the end portion 41 upwardly in the slot 42 in the lever 43. The lever 43 pivots in a clockwise direction about the pivot pin 54 inasmuch as the crank arm 53 is precluded from movement by the action of the tension spring 59. Clockwise rotation of the lever 43 is transmitted through the governor link 45 to the control lever 47 of the governor 16. The control lever 47 is rotated in a counterclockwise direction to increase the running speed of the engine 13. The directions of movement of the links and levers are shown by the arrows in FIGURE 2 and the subsequent figures.

The operation during depression of the accelerator pedal 14 has been described with the assumption that the body 12 does not move relative to the chassis frame member 11 and the engine 13. If the body 12 does move relative to the chassis frame member 11 and the engine 13, the motion cancelling mechanism 48 prevents movement of the speed controlling lever 47 in the manner now to be described. FIGURE 4 illustrates the idle position of the accelerator linkage 17 when the body 12 has moved forwardly on the chassis frame member 11 relative to the engine 13. During the forward movement, the accelerator pedal 14, bell crank assembly 25, accelerator link 21 and accelerator pedal lever 18 all will move forwardly in the same sense and degree as does the body 12 due to their connections with the body. During the forward movement, the governor control link 29 also moves forwardly to rotate the crank arm 35 and rod 36 in a clockwise direction. The clockwise rotation of the crank arm 35 and rod 36 is transmitted to the crank shaped end 39 to cause the outwardly extending portion 41 to rotate upwardly and forwardly in the slot 42 of lever 43. Lever 43 thus tends to rotate in a clockwise direction as it does when the accelerator pedal 14 is depressed.

Forward movement of the body portion 12, however, is transmitted also to the link 49 of the motion cancelling mechanism 48. The link 49 moves forwardly in the same sense and degree as did the link 29 and causes the tubular member 37 to rotate in a counterclockwise direction. The counterclockwise rotation of the tubular member 37 is transmitted through the crank arm 53 to cause the pivot pin 54 to move forwardly and downwardly. Since the pivot pin 54 forms the point of pivotal support for the link 43, its pivot point also moves forwardly and downwardly.

The effect of the motion cancelling mechanism 48 may be best understood by reference to FIGURES 5 and 6. FIGURE 5 illustrates a side view of the connection of the links to the lever 43 and shows the positions when the system is in an idle condition without relative motion having occurred between the body 12 and engine 13. FIGURE 6 illustrates the idle position also, however, the links are shown in the position they assume when the body 12 moves forwardly relative to the engine 13. As has been previously noted, the crank shaped end 39 has rotated forwardly and upwardly while the crank arm 53 has rotated forwardly and downwardly. The rotation of the crank arm 53 forwardly and downwardly would normally cause the lever 43 to rotate about the extending portion 41 of the crank shaped end 39 in a counterclockwise direction. The clockwise rotation of the crank shaped end 39 would tend to cause the lever 43 to rotate in a clockwise direction about the pivot pin 54. The vector sum of these motions, however, is such that the lever 43 actually rotates in a counterclockwise direction about its pivotal connection 44 with the governor link 45 so that the position of the governor link 45 is unaffected by the movement of the body 12 with respect to the engine 13. Said another way, the movement of the body 12 with respect to the engine 13 tends to effect equal magnitude but opposite sense motions of the governor link 45 through the accelerator linkage 17 and the motion cancelling mechanism 48, respectively, whereby no overall change in position of the governor link 45 occurs.

As has been noted, the motion cancelling mechanism 48 may also be utilized to turn the engine 13 off by cutting off its supply of fuel. This is accomplished by moving the fuel shut off lever 55 to the position shown in FIGURE 3. The fuel shut off lever 55 is rotated in a clockwise direction in opposition to the action of the tension spring 59 to rotate the crank arm 57 away from the stop 61. This draws the link 49 forwardly to rotate the crank arm 52 and tubular member 37 in a counterclockwise direction. The counterclockwise rotation causes the crank arm 53 also to rotate in a counterclockwise direction to exert a force on the lever 43 through the pivot pin 54. The crank shaped end 39 is held against rotation by the action of the coil spring 31 so that the link 43 tends to rotate about the extending portion 41. The crank arm rotates in a counterclockwise direction to exert a rearward force on the throttle link 45. This force causes the speed control lever 47 to rotate in a clockwise direction and shut off the supply of fuel to the engine 13.

As has been noted, the link 49 of the motion cancelling mechanism 48 need not be connected to the shut off lever but may be directly connected to the body 12. In addition, it is also possible to reverse the mechanism so that the links 49 and 29 are connected to the engine and engine speed controlling device, respectively. The link 45 may then be connected to the accelerator pedal. Various other changes and modifications may be made without departing from the spirit and scope of the invention, as defined by the appended claims.

I claim:

1. In combination, a first component, a second component supported for movement relative to said first component, a first member supported by said first component for control movement, a second member supported by said second component for control movement, said second member being movable with said second component upon movement of said second component relative to said first component, a linkage for transmitting positive control movement between said members comprising a first link operatively connected for movement with said second member, a second link operatively connected for movement with said second component, and motion transmitting means operatively connecting said links to said first member, said motion transmitting means being operative to transmit motion between said members when said first link is actuated and said second link is held relatively stationary and to preclude movement of said first member when said first and second links move in unison because of relative movement of said second component.

2. In combination, a first component, a second component supported for movement relative to said first component, an actuated member supported by said first component for controlled movement, an actuating member supported by said second component for controlling movement and simultaneously movable with said second component upon relative movement of said second component, a linkage for transmitting positive control movement from said actuating member to said actuated member comprising a first link operatively connected for movement with said actuating member, a second link operatively connected for movement with said second component, and motion transmitting means operatively connecting said links to said actuated member, said motion transmitting means being operative to transmit motion from said actuating member to said actuated member through said first link when said second link is held relatively stationary and to preclude movement of said actuated member when said first and second links move in unison because of relative movement of said second component.

3. A motor vehicle comprising a chassis, a body portion movably supported upon said chassis, an engine supported upon said chassis, an accelerator pedal movably supported by said body portion, a speed control device movably supported upon said engine, an accelerator linkage for transmitting positive control movement from said accelerator pedal to said speed control device comprising a first link operatively connected to said accelerator pedal for movement therewith, a second link operatively connected to said body for movement therewith, and motion transmitting means operatively connecting said links to said speed control device, said motion transmitting means being operative to transmit motion from said accelerator pedal to said speed control device through said first link upon actuation of said accelerator pedal and to preclude movement of said speed control device relative to said engine when said first and second links move in unison because of movement of said body relative to said chassis.

4. A motion transmitting linkage for transmitting positive control movement between a first member supported for control movement upon a first component and a second member supported for control movement upon a second component, said second component being supported for movement relative to said first component, said linkage including a pivotally supported lever, a first connection means between said first member and said lever for effecting pivotal movement of said lever simultaneous with movement of said first component, a second connection means between said second member and said lever for effecting pivotal movement of said lever simultaneous with movement of said second member, said second connection means being operative to cause pivotal movement of said lever upon movement of said second member induced by relative movement of said second component and upon control movement of said second member relative to said second component, a third connection means between said second component and said lever for effecting pivotal movement of said lever simultaneous with relative movement of said second component, said third connection means being operative to effect pivotal movement of said lever in a sense and magnitude to negate the pivotal movement of said lever induced through said second connection means for precluding control movement of said first member due to relative movement of said second component.

5. In a motor vehicle, a chassis, a body supported on said chassis for movement relative to said chassis, an engine supported upon said chassis, an accelerator linkage for transmitting positive control movement from an accelerator pedal supported on said body to a speed controlling device supported upon said engine, said accelerator linkage including a pivotally supported lever, a first connection between said speed controlling device and said lever for controlled movement of said speed controlling device upon pivotal movement of said lever, a second connection between said accelerator pedal and said lever for pivotally moving said lever upon movement of said accelerator pedal, said second connection being operative to cause pivotal movement of said lever upon movement of said accelerator pedal, a third connection between said body and said lever for pivotally moving said lever upon relative movement of said body, said third connection being operative to induce pivotal movement of said lever in a sense and magnitude to negate the pivotal movement of said lever induced through said second connection upon relative movement of said body for precluding movement of said speed controlling device during movement of said body relative to said chassis.

6. A motion transmitting linkage for transmitting positive control movement between a first member supported for control movement upon a first component and a second member supported for control movement upon a second component, said second component being supported for movement relative to said first component, said linkage including a pivotally supported lever, a first link means connected at one end for movement with said first member and pivotally connected at its other end to said lever for effecting pivotal movement of said lever simultaneous with movement of said first component, a second link means connected at one of its ends to said second member and pivotally connected at its other end to said lever for effecting pivotal movement of said lever simultaneous with movement of said second member, said second link means being further operative to cause pivotal movement of said lever upon relative movement of said second component, and an operative connection means between said second component and said lever for moving the point of pivotal support of said lever simultaneous with movement of said second component, the movement of said point of pivotal support effected by the last named connection means being in a sense and magnitude to preclude movement of said first link and said first member upon relative movement of said second component.

7. A motion transmitting linkage for transmitting positive control movement between a first member supported for control movement upon a first component and a second member supported for control movement upon a second component, said second component being supported for movement relative to said first component, said linkage including a lever, a first link means connected at one of its ends to said first member and pivotally connected at its other end to said lever for effecting pivotal movement of said lever simultaneous with movement of said first component, a second link means connected at one of its ends to said second member and pivotally connected at its other end to said lever for effecting pivotal movement of said lever simultaneous with movement of said second member, said second link means being operative to effect pivotal movement of said lever upon movement of said second member induced by relative movement of said second component and upon control movement of said second member relative to said second component, a third link means connected at one of its ends to said second component and pivotally connected at its other end to said lever to form the pivotal point of support for said lever, said third link means being effective to vary the pivotal point of support of said lever upon relative movement of said second component, the movement of said pivotal point of support effected by said third link means being of a sense and direction to preclude movement of said first member upon relative movement of said second component.

8. In combination, a first component, a first member supported for control movement upon said first component, a second component, means supporting said second component for movement relative to said first component, a second member supported for control movement upon said second component, and a linkage system for transmitting positive control movement between said members unaffected by relative motion between said components, said linkage system comprising a first link connected at one of its ends for movement with said first member, a lever, a pivotal connection between the other end of said first link and said lever, a second link connected at one of its ends for movement with said second member, a first crank having a crank arm, means connecting the other end of said second link to said first crank for rotating said crank arm upon movement of said second link, means pivotally connecting the crank arm of said first crank to said lever, a third link connected at one of its ends for movement with said second component, a second crank having a crank arm, means connecting the other end of said third link to said second crank for rotating said second crank upon movement of said second component, and means pivotally connecting the crank arm of said second crank to said lever, said lever being adapted to be pivoted about the pivotal connection of the crank arm of said second crank when said second component is stationary and effects simultaneous movement of said members, said lever further being adapted to pivot about its pivotal connection with said first link without effecting movement of said first member when relative movement of said second component causes movement of said second and third links.

References Cited by the Examiner

UNITED STATES PATENTS 2,884,804   5/1959   Muller _____ 74—513
3,040,596   6/1962   Du Shane et al. _____ 74—482

MILTON KAUFMAN, *Primary Examiner.*